US012755568B2

(12) United States Patent
Lee et al.

(10) Patent No.: US 12,755,568 B2
(45) Date of Patent: Oct. 6, 2026

(54) UTILIZING USER RESPONSES IN AUTOMATED CORPUS LABELLING

(71) Applicant: INTERNATIONAL BUSINESS MACHINES CORPORATION, Armonk, NY (US)

(72) Inventors: Jackson C. Lee, Rochester, MN (US); Brian Gillikin, Washington, DC (US); Zachary A. Silverstein, Georgetown, TX (US); Logan Bailey, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 18/515,917

(22) Filed: Nov. 21, 2023

(65) Prior Publication Data

US 2025/0166399 A1 May 22, 2025

(51) Int. Cl.
*G06V 20/70* (2022.01)
*G06F 3/01* (2006.01)
(Continued)

(52) U.S. Cl.
CPC .............. *G06V 20/70* (2022.01); *G06F 3/015* (2013.01); *G06V 10/774* (2022.01);
(Continued)

(58) Field of Classification Search
CPC .................................................... G06T 19/006
See application file for complete search history.

(56) References Cited

U.S. PATENT DOCUMENTS 11,210,851 B1 12/2021 Nussbaum et al.
11,301,775 B2 4/2022 Li et al.
(Continued)

FOREIGN PATENT DOCUMENTS

CN 108496285 A * 9/2018 ........... H04R 1/1041
CN 112668645 4/2021
EP 3945459 A1 * 2/2022 ........... G06N 3/0464

OTHER PUBLICATIONS

IBM, "Artificial intelligence (AI) solutions", https://www.ibm.com/artificial-intelligence, Accessed Jul. 18, 2023; 7 Pages.
(Continued)

*Primary Examiner* — Di Xiao
(74) *Attorney, Agent, or Firm* — Seed Intellectual Property Law Group LLP

(57) ABSTRACT

A computer-implemented method identifies, using a processor set, a time to inject an image and a label within a virtual reality environment or an augmented reality environment. The processor set may then inject the image and the label within the virtual reality environment or the augmented reality environment at the identified time. The processor set captures a user's response to the injected label and the injected image and determines whether the injected label accurately describes the injected image, based on the user's captured response to the injected label and the injected image. The processor set may then write the determination whether the label accurately describes the injected image to a memory, based on a degree of statistical significance of the user's response exceeding a threshold.

20 Claims, 5 Drawing Sheets

(51) Int. Cl.

| | |
|---|---|
| ***G06V 10/774*** | (2022.01) |
| ***G06V 10/776*** | (2022.01) |
| ***G06V 10/778*** | (2022.01) |
| ***G06V 10/82*** | (2022.01) |
| ***G06V 10/94*** | (2022.01) |
| ***G06V 20/20*** | (2022.01) |

(52) U.S. Cl.
CPC ........ *G06V 10/776* (2022.01); *G06V 10/7788* (2022.01); *G06V 10/82* (2022.01); *G06V 10/945* (2022.01); *G06V 20/20* (2022.01)

(56) References Cited

U.S. PATENT DOCUMENTS

2012/0306920 A1 12/2012 Bathiche et al.
2017/0004548 A1* 1/2017 Goel .................. G06Q 30/0282
2018/0060757 A1 3/2018 Li et al.
2018/0315063 A1* 11/2018 Cheesman ............. G06V 40/70
2018/0357515 A1 12/2018 Cox et al.
2019/0278797 A1* 9/2019 Joshi ................... G06F 16/5854
2019/0332931 A1 10/2019 Montantes
2023/0081577 A1* 3/2023 Walker ...................... H04L 9/50 340/5.81
2023/0351347 A1* 11/2023 Damrow ................ G06Q 20/36
2024/0330419 A1* 10/2024 Kawamoto ............. G06F 40/30
2025/0091610 A1* 3/2025 Esna Ashari Esfahani ................. B60W 60/0015

OTHER PUBLICATIONS

IBM, "Augmented and Virtual Reality Research at IBM Watson", https://researcher.watson.ibm.com/researcher/view_group.php?id=8071, Accessed Jul. 18, 2023; 6 Pages.
Bourdakos, "IBM Cloud Annotations Tool eases the process of AI data labeling", https://developer.ibm.com/blogs/ibm-cloud-annotations-tool-eases-the-process-of-ai-data-labeling/, Jan. 30, 2020; 3 Pages.
Stewart, "Five Big Problems With Labeled Data", https://www.zumolabs.ai/post/five-big-problems-with-labeled-data, Feb. 11, 2021; 3 Pages.
Fong et al., "Using human brain activity to guide machine learning", https://www.nature.com/articles/s41598-018-23618-6, Mar. 29, 2018; 10 Pages.
Anonymous, "Optimization of Message Delivery Timing Based on the Recipient's Cognitive State", https://ip.com/IPCOM/000271452, Dec. 16, 2022; 5 Pages.
Palazzo et al., "Decoding brain representations by multimodal learning of neural activity and visual features." https://ieeexplore.ieee.org/abstract/document/9097411, Apr. 18, 2020; 17 Pages.

* cited by examiner

UTILIZING USER RESPONSES IN AUTOMATED CORPUS LABELLING

BACKGROUND

Aspects of the present invention relate generally to training and using machine-learning algorithms and artificial intelligence using data captured in a virtual-reality world or in an augmented-reality world.

Over the last decade, there has been an explosion of applications for artificial intelligence (AI). In that time, AI has gone from generally a purely academic endeavor to a force powering actions across myriad industries and affecting the lives of millions each day.

In recent years, AI systems have been built to learn from thousands, or millions, of examples to help the world better understand everything around us, or to find new solutions to difficult problems. These large-scale models have led to systems that can understand written- and spoken-language, such as the natural-language processing and understanding programs that are used every day, from digital assistants to speech-to-text programs. Other systems, trained on things like images, entire works of famous artists, or every chemistry textbook in existence, have paved the way for generative models that can identify the origin of works, create new works based on historical images and styles, or new compound ideas based on the history of chemical research.

SUMMARY

In a first aspect of the invention, there is a computer-implemented method including: identifying, by a processor set, a time to inject an image and a label within a virtual reality environment or an augmented reality environment; injecting, by the processor set, the image and the label within the virtual reality environment or the augmented reality environment at the identified time; capturing, by the processor set, a user's response to the injected label and the injected image; determining, by the processor set, whether the injected label accurately describes the injected image, based on the user's captured response to the injected label and the injected image; and writing, by the processor set, the determination whether the label accurately describes the injected image to a memory, based on a degree of statistical significance of the user's response exceeding a threshold.

In another aspect of the invention, there is a computer program product including one or more computer readable storage media having program instructions collectively stored on the one or more computer readable storage media. The program instructions are executable to: identify a time to inject an image and a label within a virtual reality environment or an augmented reality environment; inject the image and the label within the virtual reality environment or the augmented reality environment at the identified time; capture a user's response to the injected label and the injected image; determine whether the injected label accurately describes the injected image, based on the user's captured response to the injected label and the injected image; and write the determination whether the label accurately describes the injected image to a memory, based on a degree of statistical significance of the user's response exceeding a threshold.

In another aspect of the invention, there is a system including a processor set, one or more computer readable storage media, and program instructions collectively stored on the one or more computer readable storage media. The program instructions are executable to: identify a time to inject an image and a label within a virtual reality environment or an augmented reality environment; inject the image and the label within the virtual reality environment or the augmented reality environment at the identified time; capture a user's response to the injected label and the injected image; determine whether the injected label accurately describes the injected image, based on the user's captured response to the injected label and the injected image; and write the determination whether the label accurately describes the injected image to a memory, based on a degree of statistical significance of the user's response exceeding a threshold.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
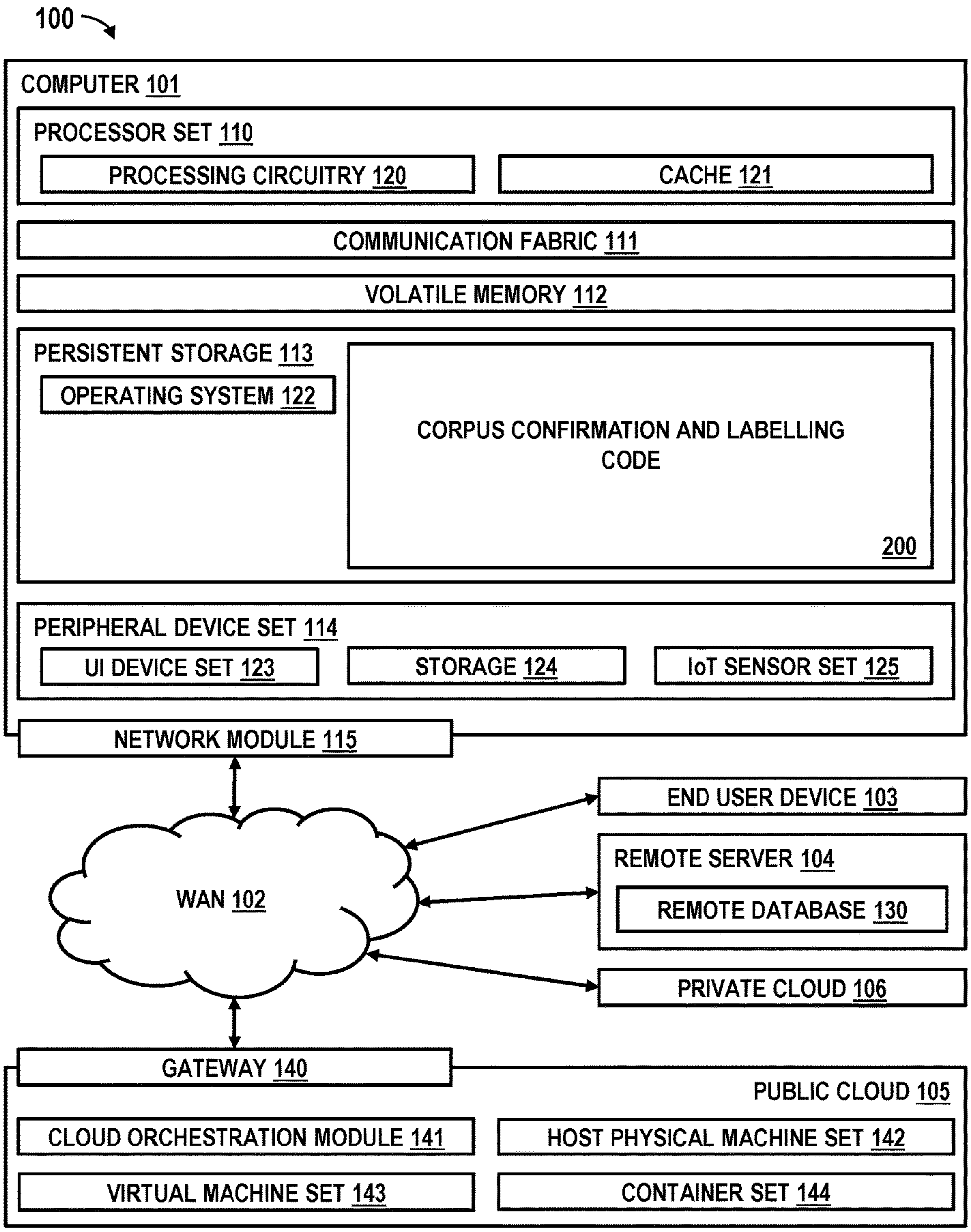
FIG. 1 depicts a computing environment according to an embodiment of the present invention.

Aspects of the present invention relate generally to training and using machine-learning algorithms and artificial intelligence using data captured in a virtual-reality world or in an augmented-reality world and, more particularly, to capturing a user's reflexive biometric data, including a user's cognitive biometric data, to determine a user's response to injected content.

According to an aspect of the invention, there is a computer-implemented method for utilizing virtual reality or augmented reality as an injectable area for consumable user biometric reflexive data labeling, the computer-implemented method including: monitoring reflexive cognitive or other biometrically measurable positive or negative responses of a user; learning based on the user's reflexive cognitive or other biometrically measurable positive or negative responses of the user to an orient to an image; labeling an accuracy of the response of the user and utilizing the responses in a reflexive injection in a virtual reality or augmented reality environment; utilizing the surrounding virtual reality (VR) environment to identify injection opportunities based on time, context, and location; responsive to identifying injection opportunities, injecting a label and secondary image for user categorization or verification, wherein the injected label and the secondary image are placed directly in the user's line of sight.

In embodiments, the method further includes executing a neural net training algorithm, wherein the neural net training algorithm enables the user to participate in data collecting activities; collecting the responses from the user in relation to the data collecting activities; and learning from the collected user responses.

In embodiments, the learning further includes learning how the user label's accurate, inaccurate, and categorical information in relation to the image and the secondary image.

In embodiments, the method further includes capturing, by an eye tracking system, the response of the user in relation to the injected secondary image. And in additional embodiments, the method further includes, responsive to capturing the response of the user in relation to the injected secondary image, writing the data to a corpus and executing compensation to the user.

In embodiments, the user's reflexive response can be determined as supervised learning for a corpus, and wherein the user's reflexive response is simply to gather information about a user's instinctual reaction to refine label accuracy.

Embodiments and aspects of the invention provide a system and method that includes training and using machine-learning (ML) algorithms and artificial intelligence (AI) using data captured in a virtual-reality world or in an augmented-reality world. More particularly, the systems and methods relate to training and using machine-learning algorithms and artificial intelligence using a user's captured reflexive biometric data, including a user's cognitive biometric data, to determine a user's response to injected content.

Applying a supervised learning approach to a large imagery dataset requires a set of corresponding high quality data labels. The usefulness of ML models that power larger AI systems are tightly tied to the quantity and quality of representative datasets. In other words, the supervised learning approach requires not only a large set of images, but it also requires a vast amount of high-quality data labels that accurately describe features in the images. However, deep domain expertise is needed to provide accurate and high-quality labels, including subject matter experts in the fields of medicine, dentistry, health care, engineering, and more. It is extremely time consuming, expensive, and difficult to train and employ subject matter experts (SMEs) from those fields to provide accurate and high-quality labels for a large set of images.

In existing technologies, SMEs must be trained to use a specific system and then take time out of their already-busy professional schedule to manually provide labels for features depicted in images within their field of expertise. For example, in radiology, after a qualified radiologist is trained on a system, the radiologist must examine x-rays or other medical images, determine the condition depicted, and manually enter the label.

Embodiments and aspects of the invention provide a system and method that improves and advances the technology in a specific and practical application. In other words, embodiments and aspects of the invention improve the accuracy of data labeling and do so in a more efficient manner. According to aspects of the invention, a user's brain waves and/or brainwave data are captured using non-invasive (i.e., non-implanted) methods, selected from a group consisting of an electroencephalogram (EEG) cap, EEG headset, earmuffs, earphones, or any other wearable device configured to measure the electrical activity of the brain (e.g., brain waves) and capture brainwave data while the user interacts in a virtual reality environment (VRE) or an augmented-reality environment (ARE). For example, using electrodes placed along the user's scalp via an EEG cap, EEG headset, earmuffs, earphones, or any other wearable device, voltage fluctuations from an electrical current in the brain are measured and/or captured as brainwave data. The system learns to detect a specific response to an injected image and a corresponding label, based on the user's brain activity. In this manner, the user may look at (i.e., interact with) the injected image and a corresponding label and, without any verbal, manual, or visible action/response, the system understands and determines whether the user agrees (or disagrees) with the injected content. In embodiments, the user's brainwaves and/or brainwave data may be captured using invasive methods.

Implementations of the invention are necessarily rooted in computer technology. For example, the steps of injecting the image and the label within the virtual reality environment or the augmented reality environment at an identified time; capturing a user's response to the injected label and the injected image; determining whether the injected label accurately describes the injected image; and writing the determination whether the label accurately describes the injected image to a memory, are computer-based and cannot be performed in the human mind. Training and using a machine learning model are, by definition, performed by a computer and cannot practically be performed in the human mind (or with pen and paper) due to the complexity and massive amounts of calculations involved. For example, an artificial neural network may have millions or even billions of weights that represent connections between nodes in different layers of the model. Values of these weights are adjusted, e.g., via backpropagation or stochastic gradient descent, when training the model and are utilized in calculations when using the trained model to generate an output in real time (or near real time). Given this scale and complexity, it is simply not possible for the human mind, or for a person using pen and paper, to perform the number of calculations involved in training and/or using a machine learning model.

It should be understood that, to the extent implementations of the invention collect, store, or employ personal information provided by, or obtained from, individuals (for example, measuring a user's brain activity to determine an intended response), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as corpus confirmation and labelling code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
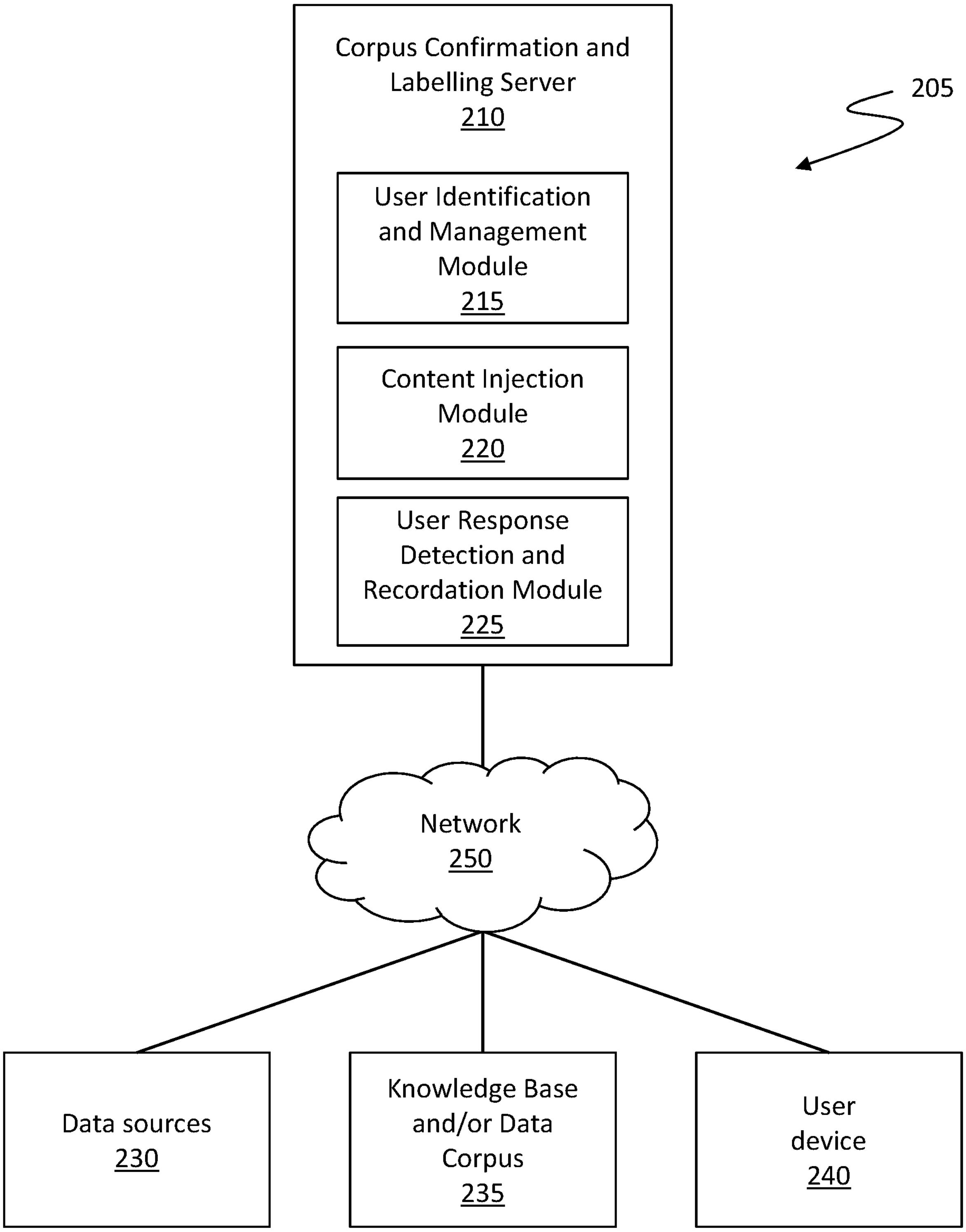
FIG. 2 shows a block diagram of an exemplary environment in accordance with aspects of the present invention.

FIG. 2 shows a block diagram of exemplary environment 205 in accordance with aspects of the invention. In embodiments, environment 205 includes corpus confirmation and labelling server 210, data sources 230, knowledge base 235, user device 240, and network 250.

The corpus confirmation and labelling server 210 may comprise one or more instances of computer 101 of FIG. 1. In another example, corpus confirmation and labelling server 210 may comprise one or more virtual machines or containers running on one or more instances of computer 101 of FIG. 1. In embodiments, corpus confirmation and labelling server 210 communicates with data sources 230, knowledge base and/or data corpus (knowledge base) 235, and user device 240, via network 250, which may comprise WAN 102 of FIG. 1. In embodiments, data sources 230 comprise one or more data sources each comprising an instance of remote database 130 and/or remote server 104 of FIG. 1. In embodiments, knowledge base 235 comprises one or more knowledge bases each comprising an instance of remote database 130 and/or remote server 104 of FIG. 1. In embodiments, and user device 240 each comprise an instance of EUD 103 of FIG. 1. There may be plural different instances of user device 240 including, for example, virtual-reality devices, augmented-reality devices, biometric-data-capturing devices, and/or other personal computing devices. The different instances of user device 240 may be used by different users and evaluators, respectively.

In embodiments, corpus confirmation and labelling server 210 of FIG. 2 comprises user identification and management module 215, content injection module 220, and user response detection and recordation module 225, each of which may comprise modules of corpus confirmation and labelling code of block 200 of FIG. 1. Such modules may include routines, programs, objects, components, logic, data structures, and so on that perform a particular task (or tasks) or implement a particular data type (or types) that the corpus confirmation and labelling code of block 200 uses to carry out the functions and/or methodologies of embodiments of the invention as described herein. These modules of corpus confirmation and labelling code of block 200 are executable by computer 101 of FIG. 1 (e.g., processing circuitry 120 of FIG. 1) to perform the inventive methods as described herein. The corpus confirmation and labelling server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, user identification and management module 215 is configured to receive, identify, and manage a user's data within the computing environment, such as computing environment 100 of FIG. 1. In an embodiment, user identification and management module 215 may receive a user's login credentials, including the user's username and password. In embodiments, user identification and management module 215 may request, receive, manage, and/or store a user's professional credentials. As used herein, professional credentials may include one or more of a resume, curriculum vitae, professional license(s), educational degree(s), educational or professional certificate(s), and/or another indication of the user's competency or expertise within a field. For example, in an embodiment user identification and management module 215 may request, receive, manage, and/or store a radiologist's medical license. In embodiments, user identification and management module 215 uses this information to determine, classify, and/or verify that the user is a subject matter expert (SME) in a specific field. In embodiments, user identification and management module 215 may request, receive, manage, and/or store a user's system-specific credentials including, for example, system-specific training for operating in a virtual reality environment (VRE), an augmented-reality environment (ARE), classifying or labelling data using specific techniques, and/or training on performance tasks within the system environment. In other words, in embodiments, a processor set or system may determine, classify, and/or verify that the user is a subject matter expert in a specific field based on a user's professional credentials (e.g., a resume, curriculum vitae, professional license(s), educational degree(s), educational or professional certificate(s), system-specific training or credentials, and/or another indication of the user's competency or expertise within a field). In this manner, embodiments may be configured to determine an area of expertise of the user based, at least in part, on a professional credential of the user.

In embodiments, user identification and management module 215 of FIG. 2, analyzes the user's professional credentials and/or system-specific credentials. In such embodiments, user identification and management module 215 classifies, without input from the user or a system operator, the user as an SME. In other embodiments, the classification is manually completed by a system operator.

In embodiments, user identification and management module 215 optionally provides an opportunity for a user to volunteer or agree on a form of compensation based on the content to be presented to the user. In embodiments, the compensation includes, for example, currency, a virtual token, a virtual currency, or some other form of compensation agreed upon between the user and a system operator. Upon completing an agreed upon task, user identification and management module 215 compensates the user for their interaction(s) with the injected content.

In accordance with aspects of the invention, content injection module 220 is configured communicate with one or more user devices, such as user device 240 of FIG. 2, and determine if a user is in a proper state of mind, determine whether to inject a label and an image in a VRE or an ARE, and inject the label and the image in the VRE or ARE at one or more user devices.

In accordance with aspects of the invention, user response detection and recordation module 225 is configured to communicate with one or more user devices, such as user device 240 of FIG. 2, to capture a user's response to content injected in a VRE or an ARE. In embodiments, the user's response includes, for example, a user's pulse, brainwaves, eye movements, and/or other reflexive biometric data that indicates whether the user agrees or disagrees whether the injected label and injected image match. As used herein, biometric data are measures of a user's reaction to a stimuli. In accordance with aspects of the invention, the stimuli may be an injected image and an injected label and the reflexive biometric data, including a user's cognitive biometric data, measure the user's immediate response before the user has time to reflect upon the injected information. In other words, the reflexive biometric data, as used herein, capture the user's "gut reaction" to the injected content.

As described herein, an injected label and an injected image match when the injected label properly describes a condition or feature visible in the injected image. For example, if the injected label displays "hairline tibial plateau fracture" and the displayed image is an x-ray of an injury showing a broken bone and injured cartilage covering the top end of a patient's tibia, a radiologist's reflexive biometric response would indicate that the injected label and injected image match. In another example, if the injected label displays "displaced fibula fracture" and the displayed image is an x-ray of an injury showing a patient's broken wrist, a radiologist's reflexive biometric response would indicate that the injected label and injected image did not match. In embodiments the user may be asked to provide an audible or written response indicating whether they agree or disagree with the label associated with an injected image. In embodiments, if the user finds that the injected label and the injected image do not match, the user may be asked to provide a matching label. For example, returning to the non-matching label of "displaced fibula fracture," the radiologist may suggest that the proper label is "distal radius fracture."

In accordance with aspects of the invention, user response detection and recordation module 225 is further configured to determine a degree of statistical significance and/or confidence, and store the data to a data corpus, such as knowledge base 235 of FIG. 2. As used herein, a data corpus refers to all data collected for a particular research project.

Figure 3A:
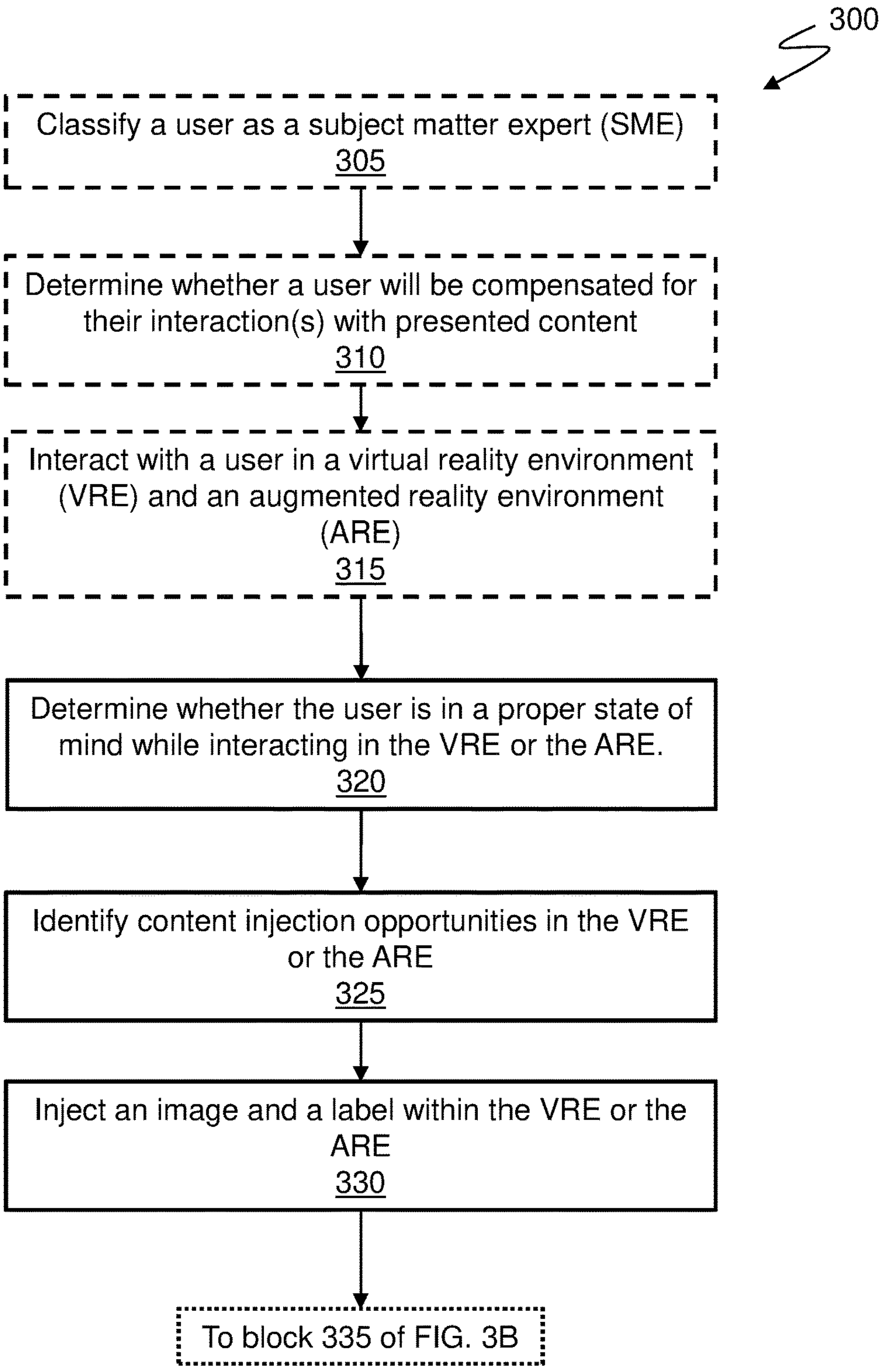
FIGS. 3A and 3B show a flowchart of an exemplary method in accordance with aspects of the present invention.
Figure 3B:
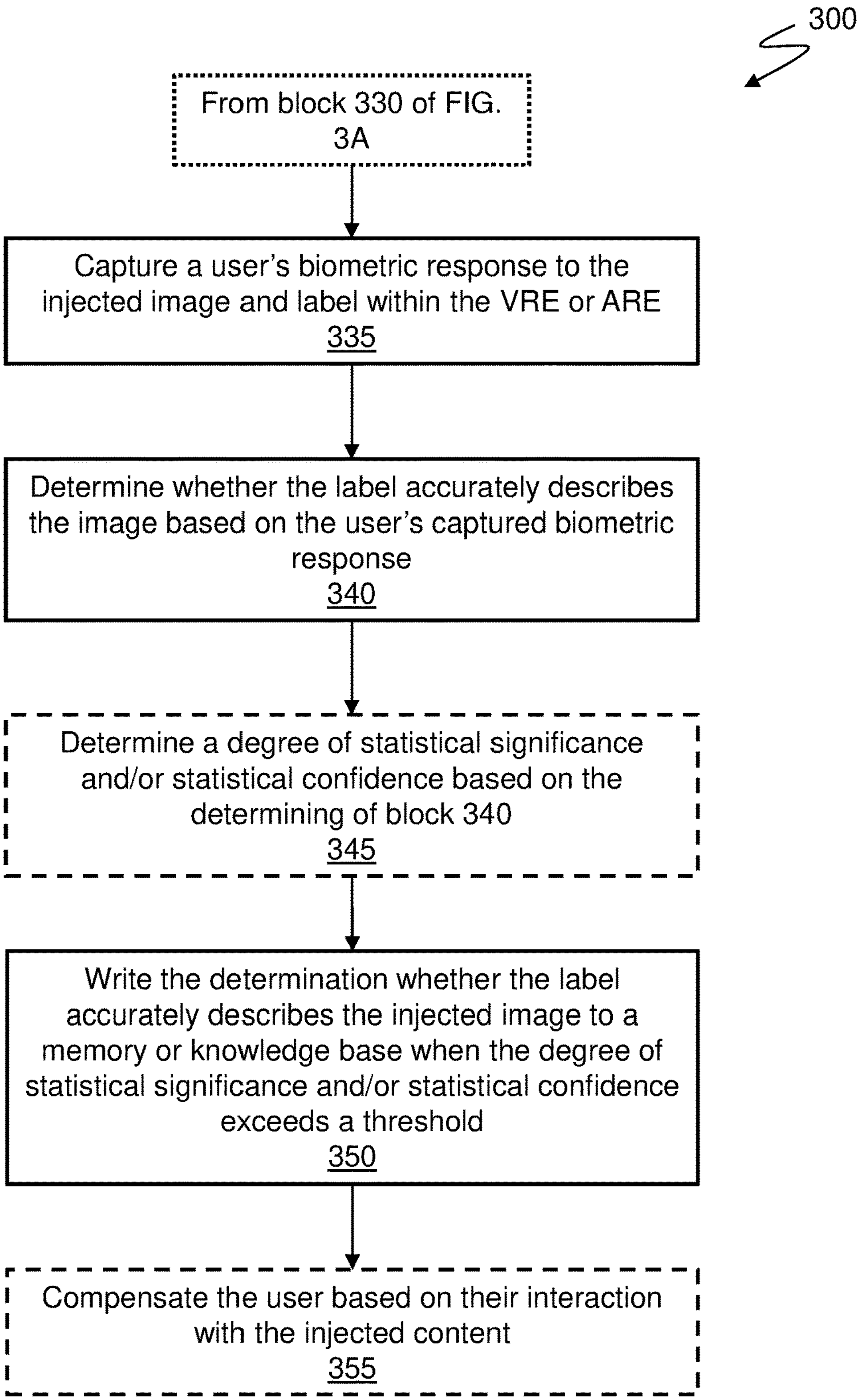

FIGS. 3A and 3B show a flowchart of an exemplary method 300 in accordance with aspects of the present invention. Steps of method 300 may be carried out in the environment of FIG. 2 and are described with reference to elements depicted in FIG. 2.

At block 305, user identification and management module 215 of FIG. 2 optionally classifies a user as an SME. This classification may be made by user identification and management module 215 without input from the user or a system operator. As described above, in embodiments, the classification is made based on the user's login credentials, the user's professional credentials, and/or the user's system-specific credentials.

At block 310, user identification and management module 215 of FIG. 2 additionally, or optionally, determines whether a user will be compensated for their interaction(s) with the injected content. As noted above, in embodiments a user and a system operator may agree upon a form of compensation for their interaction(s) with the injected content. In such embodiments, user identification and management module 215 tracks and records the user's interactions and provides the agreed upon compensation at the completion of the interaction(s).

At block 315, content injection module 220 of FIG. 2 optionally interacts with a user within a virtual reality environment (VRE) or an augmented reality environment (ARE). Content injection module 220 interacts with a user to train a neural net algorithm where corpus confirmation and labelling server 210 learns accurate data labels, inaccurate data labels, and/or other categorical information with respect to an image. In other words, the algorithm is trained to determine an accurate data label with respect to an image based on a plurality of user interactions via content injection module 220 of FIG. 2.

In embodiments, block 315 may further include using user response detection and recordation module 225 of FIG. 2 to calibrate user-specific brain activity to establish a baseline for the brain-activity tendencies of each user, such that user response detection and recordation module 225 can learn to detect a user-specific response to the injected content based on the user's brain activity. For example, response detection and recordation module 225 may learn that a specific type of brain activity coincides with the user's agreement (or disagreement) with the injected content. A different type of brain activity may also be determined to coincide with the user's disagreement with the injected content. In this manner, the user passively provides a response by looking at (i.e., interact with) the injected content and, without any verbal, manual, or visible action (i.e., passively), response detection and recordation module 225 determines whether the user agrees (or disagrees) with the injected content.

In another example, at block 315 user response detection and recordation module 225 may also establish a baseline using the user's P300 (or P3) wave. Specifically, at about 300 milliseconds after the onset of an event (e.g., after a user views injected content in the VRE or ARE), if the event is sufficiently surprising to a user, there will be a stronger brain-wave response, relative to the user's baseline. Accordingly, in embodiments, user response detection and recordation module 225 measures the user's P300 (or P3) response to determine whether the user agrees (or disagrees) with the injected content. In embodiments, the user's baseline may be further established by determining the user's response to known good (i.e., accurate) labels and known bad (i.e., inaccurate) labels.

At block 320, content injection module 220 of FIG. 2 determines whether the user is in a proper state of mind while interacting in the VRE or the ARE. In embodiments, content injection module 220 may examine/consult, for example, the time of day, the user's perceived level of engagement with their VRE or ARE, the user's heart rate, the user's perceived level of stress, the user's professional calendar, and other factors that may determine the user's likelihood of interacting with injected content. In an example, if content injection module 220 determines that the user is playing an intense metaverse game, the system may determine the user's current state of mind is not ideal for interacting with injected content. In another example, if a radiologist is wearing augmented-reality glasses, and content injection module 220 determines that the user is between appointments (i.e., based on the user's calendar) and that the user is reading the news on their glasses (i.e., based on the user's ARE engagement), content injection module 220 may determine that the user's current state of mind is ideal for interacting with injected content.

At block 325, content injection module 220 of FIG. 2 identifies content injection opportunities in the VRE or the ARE. In an embodiment, identifying content injection opportunities includes, for example, determining whether it is an appropriate time, context, and/or frequency to interrupt the user's activities in the VRE or ARE. In other words, it may be desirable to inject content at points in time where the user is more likely to cooperate and interact with the injected content. For example, if the user is currently engaging in a mindless activity or game within a VRE, content injection module 220 may determine that the user would likely interact with the injecting content. However, in another example, if the user is currently engaging in an intense training exercise or game within a VRE, content injection module 220 may determine that the user would not likely interact with the injecting content.

At block 330, content injection module 220 of FIG. 2 injects an image and a label within the VRE or ARE based, at least in part, on determining that the user is in a proper state of mind as per block 320 and/or identifying a content injection opportunity as per 325. In accordance with aspects of the invention, the injected content includes a label and an image. In embodiments, the injected content may include one or more labels and one or more images, to train a neural net algorithm to learn/determine accurate data labels, inaccurate data labels, and/or other categorical information with respect to one or more images. In embodiments, the injected label describes, or attempts to describe, the injected image.

At block 335, user response detection and recordation module 225 of FIG. 2 captures a user's biometric response to the injected image and label within the VRE or ARE. As noted above, user response detection and recordation module 225 is configured to communicate with one or more user devices, such as user device 240 of FIG. 2, to capture a user's response to content injected into the VRE or the ARE. In embodiments, the user's response includes, for example, a user's pulse, brainwaves, eye movements, and/or other reflexive biometric data that indicates whether the user agrees or disagrees whether the injected label and injected image match.

In embodiments, the user's pulse is captured using a wristwatch or any heart rate monitor that is configured to capture a wearer's pulse (i.e., heart rate) and communicate the pulse to a user device, such as user device 240 of FIG. 2. For example, the system may learn that when the user agrees with the injected content, their pulse may quicken. For a different user, when the user agrees with the injected content, the different user's pulse may slow down. In other embodiments, when the user's pulse remains the same, it may also indicate a positive or a negative reaction to the injected content. As the user interacts with the system a baseline may be established to learn the tendencies of each user, such that user response detection and recordation module 225 can learn to detect a user-specific response to the injected content based on the user's pulse. In embodiments, the baseline may be established based on the user's evoked response potential (ERP).

In embodiments, the user's brainwaves and/or brainwave data are be captured using non-invasive methods, including an electroencephalogram (EEG) cap, headset, earphones, earmuffs, earphones, or any other wearable device configured to measure the electrical activity of the brain (e.g., brainwaves), capture brainwave data, and communicate the electrical activity of the brain and/or brainwave data to a user device, such as user device 240 of FIG. 2. For example, using electrodes placed along the scalp via an EEG cap, headset, earmuffs, earphones, or any other wearable device, user response detection and recordation module 225 measures voltage fluctuations from an electrical current in the brain. In embodiments, the electrodes may be wet electrodes, dry electrodes, or a combination thereof. In additional embodiments, the user's brainwaves and/or brainwave data are captured using invasive (i.e., implantable) methods.

User response detection and recordation module 225 then compares the captured biometric response with a user's established baseline, such that user response detection and recordation module 225 can learn to detect a user-specific response to the injected content based on the user's brain activity. For example, response detection and recordation module 225 may learn that a specific type of brain activity, when compared to the user's baseline brainwave activity, coincides with the user's agreement with the injected content. A different type of brain activity, when compared to the user's baseline brainwave activity, may also be determined to coincide with the user's disagreement with the injected content. In this manner, the user passively provides a response by looking at (i.e., interact with) the injected content and, without any verbal, manual, or visible action (i.e., passively), response detection and recordation module 225 determines whether the user agrees (or disagrees) with the injected content. As described above, in an example, user response detection and recordation module 225 may establish a baseline using the user's P300 (or P3) wave. Specifically, at about 300 milliseconds after the onset of an event (e.g., after a user views injected content in the VRE or ARE), if the event is sufficiently surprising to a user, there will be a stronger brain-wave response, relative to the user's baseline. Accordingly, in embodiments, user response detection and recordation module 225 measures the user's P300 (or P3) response to determine whether the user agrees (or disagrees) with the injected content.

In embodiments, the user's eyes and eye movements are captured using any image capturing device configured to monitor a user's eye shape, detect the user's field of view, and/or detect the user's fixed focal point. In embodiments, the user's change in eye shape indicates an agreement or disagreement with the injected content. For example, a user's pupil(s) dilating may signal and agreement or disagreement with the injected content. As the user interacts with the system a baseline may be established to learn the pupil sizes and other eye shapes of each user, such that user response detection and recordation module 225 can learn to detect a user-specific response to the injected content based on the user's pupil(s).

In embodiments, user response detection and recordation module 225 tracks the user's eye movements to ensure that the injected content is placed within the field of view of the user. In such embodiments, user response detection and recordation module 225 determines whether the user has fixed their eyes on the injected content by determining the user's fixed focal point.

At block 340, user response detection and recordation module 225 of FIG. 2 determines whether the label accurately describes the image based on the user's captured biometric response. For example, in embodiments, user response detection and recordation module 225 compares the user's reflexive biometric data before and/or at the time the user's eyes are focused on the injected content against the reflexive biometric data received immediately after, and/or for a period of time after, the user's eyes were focused on the injected content. In this manner, user response detection and recordation module 225 determines whether the user agrees with (or disagrees with) the injected content based on the captured reflexive biometric data, as disclosed herein. In other words, user response detection and recordation module 225 captures the user's reflexive biometric data when the user is in the VRE or ARE. When content injection module 220 of FIG. 2 injects an image and a label within the VRE or ARE based, user response detection and recordation module 225 continues capturing the user's reflexive biometric data. After a period of time after the event, user response detection and recordation module 225 compares the user's reflexive biometric data before the content injection against the user's reflexive biometric data after the content injection. User response detection and recordation module 225 uses this data to determine whether the user's response indicates that the image and label are associated with each other, in accordance with the reflexive biometric data indications described herein. In embodiments, block 340 may further include comparing a user's current captured reflexive biometric data against the user's baseline response that is established, for example, based on the user's evoked response potential (ERP). For example, if the user's pulse was at 58 beats per minute (bpm) before the user focused on the injected content and 62 bpm after the user focused on the injected content, user response detection and recordation module 225 may rely on this data to determine that the user agreed (or disagreed) with the injected content. In embodiments, agreeing with the injected content means that the injected label and the injected image match.

Additionally, or alternatively, if the user's brain activity within (or at) a specified period after the user focused on the injected content, indicates a first characteristic, user response detection and recordation module 225 may rely on this data to determine that the user agreed with the injected content. If the user's brain activity within (or at) a specified period after the user focused on the injected content, indicates a second characteristic, user response detection and recordation module 225 may rely on this data to determine that the user disagreed with the injected content.

At block 345, user response detection and recordation module 225 of FIG. 2 optionally determines a degree of statistical significance and/or statistical confidence based on the determining of block 340. In embodiments, user response detection and recordation module 225 may determine that one piece of reflexive biometric data, including a user's cognitive biometric data, is more indicative of the user's intentions than another piece of reflexive biometric data. In such embodiments, more (or less) weight may be given to the biometric data. For example, in embodiments, user response detection and recordation module 225 may determine that a user's brainwave activity is more accurate and more indicative of a user's true intentions than the user's pupil size(s). In such embodiments, user response detection and recordation module 225 may determine that more weight should be given to the user's brainwave activity than the user's pupil size(s). In an embodiment, the determined degree of statistical significance and/or statistical confidence may be used to further determine whether the user's input qualifies as supervised learning for a corpus.

At block 350, user response detection and recordation module 225 of FIG. 2 writes the determined user response (e.g., whether the label accurately describes the injected image) to a memory, such as data sources 230 of FIG. 2, or to a knowledge base, such as knowledge base 235 of FIG. 2 over a network, such as network 250, when the degree of statistical significance and/or statistical confidence exceeds a threshold. In an embodiment, the degree of statistical significance and/or statistical confidence is a value, score, or level of confidence in the user's biometric response, as it relates to determining whether the injected label accurately (or inaccurately) describes the injected image. In embodiments the user response may be recorded at corpus confirmation and labelling server 210.

At block 355, user identification and management module 215 optionally compensates the user based on their interaction with the injected content. As described above, in embodiments, compensation includes, for example, currency, a virtual token, a virtual currency, or some other form of compensation agreed upon between the user and a system operator.

In embodiments, exemplary method 300 of FIGS. 3A and 3B is conducted multiple times for multiple images and labels. In other words, the same image may be injected multiple times with the same injected label, to further refine the user's reflexive biometric response to the injected content. By attempting multiple iterations in this manner, a consensus and/or a higher level of confidence may be achieved as the data is refined with multiple iterations.

Embodiments and aspects of the invention may be used for gathering data describing a target audience's response to various products and services. For example, a marketing company could inject an image and a label into a VRE or ARE while a user is interacting with another program. In such embodiments, the injected content simulates a real-life environment and presents users with different images, advertisements, or products. In embodiments, the system analyzes the user's biometric reflexive responses to determine their gut reaction to the stimuli. Marketing companies could use this information to refine marketing strategies, improve product development, and better understand their audience's true reaction before they have time to reflect on the injected content. It is to be understood that the disclosed method for capturing a user's "gut feeling" or true reflexive response, within a VRE or ARE, could be employed across multiple industries.

Figure 4:
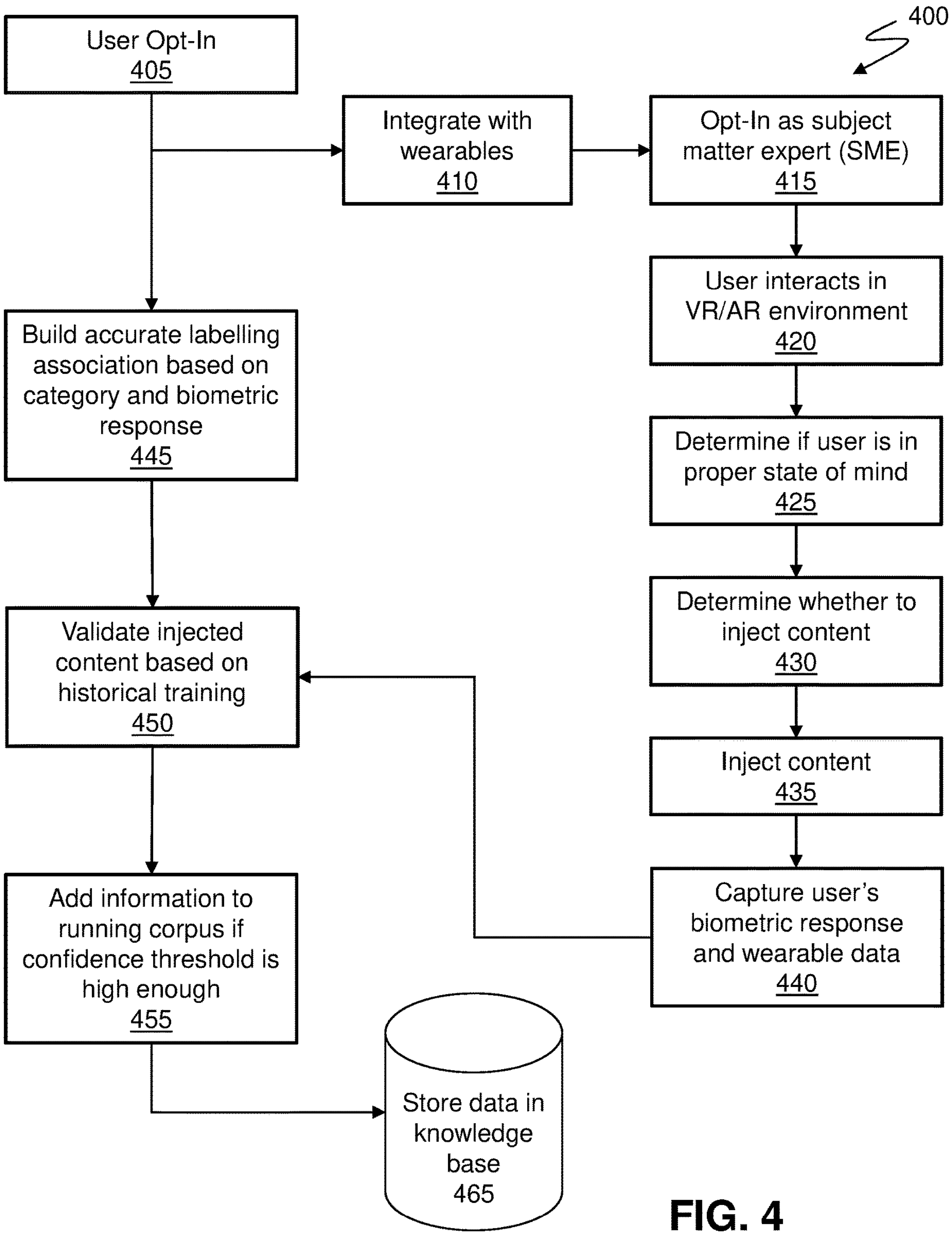
FIG. 4 shows a flowchart of an exemplary method in accordance with aspects of the present invention.

FIG. 4 shows a flowchart of an exemplary method 400 in accordance with aspects of the present invention. Steps of method 400 may be carried out in the environment of FIG. 2.

At block 405, a user may opt-in to interacting with the environment of FIG. 2. In other words, the user opts into interacting with the environment and thereby indicates a desire to provide their expertise.

At block 410, component(s) of environment of FIG. 2 integrates with wearables. In other words, the environment of FIG. 2 integrates with a user's wearable devices, internet-of-things (IOT) devices, and either virtual-reality software or augmented-reality software. In embodiments, the user's wearable devices include user device 240.

At block 415, the user may opt-in as an SME. In other words, the user may optionally agree to be marked as a SME in a specific domain or knowledge labelling category. In embodiments, the user may receive compensation, further professional expertise/credentials, or other incentivization for their interactions with the environment of FIG. 2.

At block 420, the user interacts in a virtual-reality world or an augmented reality world. At block 425, component(s) of the environment of FIG. 2 determine if the user is in a proper state of mind. In other words, the system may gauge the metrics and biometrics of the user to determine if the user is in the proper state of mind to interact with the environment of FIG. 2 by reviewing injected content.

At block 430, component(s) of the environment of FIG. 2 determine whether to inject content. In other words, the system processes the virtual-reality world (or augmented-reality world) through an integration to determine image and label injection real estate within the virtual-reality world (or augmented-reality world). In embodiments, the system may determine an optimal time, optimal frequency, etc., to inject the content. As described herein, the optimal time and optimal frequency mean the time and frequency where a specific user is most likely to interact with the injected content.

At block 435, component(s) of the environment of FIG. 2 inject content. In other words, the system may inject an image and a label into the virtual-reality world (or augmented-reality world) using the techniques described above.

At block 440, component(s) of the environment of FIG. 2 capture user's biometric response and wearable data. In other words, the system captures the user's biometric response and wearable data feed based on the injected image and label.

At block 445, component(s) of the environment of FIG. 2 build accurate labelling association based on category and biometric response. In other words, the system processes the biometric data, including EEG and other responses to build an accurate labelling association based on the knowledge category and bodily response. In embodiments, building the accurate label associations further includes learning the user's baseline responses to accurately determine whether the user agrees (or disagrees) with the injected content.

At block 450, component(s) of the environment of FIG. 2 validate injected content based on historical training. In embodiments, the validation is determined by (or based on) comparing the response of block 440 to the response of block 445.

At block 455, component(s) of the environment of FIG. 2 add information to running corpus if confidence threshold is high enough. At block 460, component(s) of the environment of FIG. 2 store data in knowledge base, such as data sources 230 and/or knowledge base and/or data corpus 235.

In embodiments, a service provider could offer to perform the processes described herein. In this case, the service provider can create, maintain, deploy, support, etc., the computer infrastructure that performs the process steps in accordance with aspects of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In additional embodiments, implementations provide a computer-implemented method, via a network. In this case, a computer infrastructure, such as computer 101 of FIG. 1, can be provided and one or more systems for performing the processes in accordance with aspects of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes in accordance with aspects of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

identifying, by a processor set, a time to inject an image and a label within a virtual reality environment or an augmented reality environment, wherein identifying the time comprises identifying one or more content injection opportunities based on time, context, and location within the virtual reality environment or the augmented reality environment;

determining whether a user is in a state suitable for interaction with the image and the label, based on the time, context, and location;

injecting, by the processor set, the image and the label within the virtual reality environment or the augmented reality environment at the identified time based, at least in part, on determining that the user is in the suitable state for interaction;

capturing, by the processor set, a user's reflexive biometric response to the injected label and the injected image;

determining, by the processor set, whether the injected label accurately describes the injected image, based on using a neural net algorithm trained on a plurality of user interactions with respect to the injected image, the user's captured reflexive biometric response to the injected label, and the injected image; and writing, by the processor set, the determination whether the label accurately describes the injected image to a memory, based on a degree of statistical significance of the user's reflexive biometric response exceeding a threshold.

2. The computer-implemented method of claim 1, further comprising classifying, by the processor set, the user as a subject matter expert in a specific field.

3. The computer-implemented method of claim 2, wherein the classifying further comprises determining, by the processor set, an area of expertise of the user based, at least in part, on a professional credential of the user.

4. The computer-implemented method of claim 1, further comprising determining, by the processor set, whether the user will be compensated for the user's reflexive biometric response to the injected label and the injected image.

5. The computer-implemented method of claim 4, further comprising compensating, by the processor set, the user based on the user's reflexive biometric response to the injected label and the injected image.

6. The computer-implemented method of claim 1, further comprising interacting, by the processor set, with the user within the virtual reality environment or the augmented reality environment, wherein the identifying the time to inject the image and the label is based, at least in part, on an interaction with the user within the virtual reality environment or the augmented reality environment.

7. The computer-implemented method of claim 1, further comprising determining, by the processor set, the degree of statistical significance based, at least in part, on the determination whether the injected label accurately describes the injected image.

8. The computer-implemented method of claim 1, wherein the user's reflexive biometric response comprises brainwave data of the user.

9. The computer-implemented method of claim 8, wherein the brainwave data of the user is captured using one or more devices selected from a group consisting of an electroencephalogram cap, an electroencephalogram headset, earphones configured to measure electrical activity of a brain of the user, and earmuffs configured to measure the electrical activity of the user's brain.

10. A computer program product comprising one or more computer readable storage media having program instructions collectively stored on the one or more computer readable storage media, the program instructions executable to:

identify a time to inject an image and a label within a virtual reality environment or an augmented reality environment, wherein identification of the time comprises identification of one or more content injection opportunities based on time, context, and location within the virtual reality environment or the augmented reality environment;

determine whether a user is in a state suitable for interaction with the image and the label, based on the time, context, and location;

inject the image and the label within the virtual reality environment or the augmented reality environment at the identified time based, at least in part, on determination that the user is in the suitable state for interaction;

capture a user's reflexive biometric response to the injected label and the injected image;

determine whether the injected label accurately describes the injected image, based on using a neural net algorithm trained on a plurality of user interactions with respect to the injected image, the user's captured reflexive biometric response to the injected label, and the injected image; and write the determination whether the label accurately describes the injected image to a memory, based on a degree of statistical significance of the user's reflexive biometric response exceeding a threshold.

11. The computer program product of claim 10, wherein the program instructions are further executable to classify the user as a subject matter expert in a specific field.

12. The computer program product of claim 11, wherein the program instructions are further executable to determine an area of expertise of the user based, at least in part, on a professional credential of the user.

13. The computer program product of claim 10, wherein the program instructions are further executable to determine whether the user will be compensated for the user's reflexive biometric response to the injected label and the injected image.

14. The computer program product of claim 13, wherein the program instructions are further executable to compensate the user based on the user's reflexive biometric response to the injected label and the injected image.

15. The computer program product of claim 10, wherein the program instructions are further executable to interact with the user within the virtual reality environment or the augmented reality environment, wherein the identifying the time to inject the image and the label is based, at least in part, on the interaction with the user within the virtual reality environment or the augmented reality environment.

16. The computer program product of claim 10, wherein the program instructions are further executable to determine the degree of statistical significance based, at least in part, on the determination whether the injected label accurately describes the injected image.

17. The computer program product of claim 10, wherein the user's reflexive biometric response comprises brainwave data of the user and wherein the brainwave of the user is captured using one or more devices selected from a group consisting of an electroencephalogram cap, an electroencephalogram headset, earphones configured to measure electrical activity of a user's brain, and earmuffs configured to measure the electrical activity of the user's brain.

18. A system comprising:

a processor set, one or more computer readable storage media, and program instructions collectively stored on the one or more computer readable storage media, the program instructions executable to:

identify a time to inject an image and a label within a virtual reality environment or an augmented reality environment, wherein identification of the time comprises identification of content injection opportunities based on time, context, and location within the virtual reality environment or augmented reality environment;

determine whether a user is in a state suitable for interaction with the image and the label, based on the time, context, and location;

inject the image and the label within the virtual reality environment or the augmented reality environment at the identified time based, at least in part, on determination that the user is in the suitable state for interaction;

capture a user's reflexive biometric response to the injected label and the injected image;

determine whether the injected label accurately describes the injected image, based on using a neural net algorithm trained on a plurality of user interactions with respect to the injected image, the user's captured reflexive biometric response to the injected label, and the injected image; and write the determination whether the label accurately describes the injected image to a memory, based on a degree of statistical significance of the user's reflexive biometric response exceeding a threshold.

19. The system of claim 18, wherein the program instructions are further executable to classify the user as a subject matter expert in a specific field, and wherein the program instructions are further executable to determine an area of expertise of the user based, at least in part, on a professional credential of the user.

20. The system of claim 18, wherein the user's reflexive biometric response comprises brainwave data of the user, and wherein the brainwave data of the user is captured using one or more devices selected from a group consisting of an electroencephalogram cap, an electroencephalogram headset, earphones configured to measure electrical activity of a user's brain, and earmuffs configured to measure the electrical activity of the user's brain.

* * * * *